(12) United States Patent
Legner

(10) Patent No.: US 7,299,891 B2
(45) Date of Patent: Nov. 27, 2007

(54) HYDRAULIC DRIVE MECHANISM FOR MOBILE VEHICLES

(75) Inventor: Jürgen Legner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 92 days.

(21) Appl. No.: 10/909,440

(22) Filed: Aug. 2, 2004

(65) Prior Publication Data
US 2006/0021818 A1    Feb. 2, 2006

(51) Int. Cl.
*B60K 17/10* (2006.01)

(52) U.S. Cl. .................................. 180/307

(58) Field of Classification Search ............. 180/305, 180/307, 308, 242; 60/483, 494
See application file for complete search history.

(56) References Cited

U.S. PATENT DOCUMENTS

| | | | |
|---|---|---|---|
| 3,465,616 A | | 9/1969 | Schou |
| 3,990,327 A | | 11/1976 | Margolin |
| 4,069,886 A | | 1/1978 | Campbell et al. |
| 4,354,400 A | | 10/1982 | Baker |
| 4,653,271 A | * | 3/1987 | Reeves et al. ............... 60/494 |
| 5,159,992 A | | 11/1992 | Reinecke et al. |
| 5,388,450 A | * | 2/1995 | Hurth ........................ 74/331 |
| 5,394,771 A | | 3/1995 | Schroder |
| 5,617,764 A | | 4/1997 | Komura et al. |
| 5,766,107 A | | 6/1998 | Englisch |
| 5,848,565 A | * | 12/1998 | Thoma ........................ 91/491 |
| 6,145,312 A | * | 11/2000 | Hauser et al. ............... 60/464 |
| 6,367,572 B1 | * | 4/2002 | Maletschek et al. ........ 180/305 |
| 6,508,328 B1 | * | 1/2003 | Kenyon et al. ............. 180/308 |
| 6,622,594 B2 | | 9/2003 | Ikari et al. |
| 6,675,576 B2 | * | 1/2004 | Bigo et al. ................... 60/436 |
| 6,849,028 B2 | | 2/2005 | Nakatani et al. |
| 7,070,531 B2 | | 7/2006 | Ishizaki |
| 7,082,760 B2 | | 8/2006 | Legner et al. |

FOREIGN PATENT DOCUMENTS

| | | |
|---|---|---|
| DE | 1 132 450 | 1/1963 |
| DE | 19 01 959 | 10/1977 |
| DE | 37 44 215 C2 | 5/1991 |
| DE | 39 07 633 C2 | 7/1992 |
| DE | 196 24 534 A1 | 1/1998 |
| DE | 198 27 130 A1 | 12/1999 |
| DE | 100 34 752 A1 | 8/2002 |
| EP | 0 483 543 A1 | 5/1992 |
| GB | 1 288 508 | 9/1972 |
| JP | 11230307 | 8/1999 |
| WO | WO 99/17021 | 4/1999 |

* cited by examiner

*Primary Examiner*—Frank Vanaman
(74) *Attorney, Agent, or Firm*—Davis Bujold & Daniels, P.L.L.C.

(57) ABSTRACT

To make operating a hydraulic drive mechanism above its admissible maximum rotational speed without separating the mechanical connection to the drive wheel possible, the motor (1) is adjusted in displacement to almost no displacement and the pressure-medium supply line (2) and the pressure-medium return line (3) operate a hydraulic drive with at least a hydrostatic radial piston motor (7, 9) exclusively with the supply pressure (20) connected.

11 Claims, 3 Drawing Sheets

HYDRAULIC DRIVE MECHANISM FOR MOBILE VEHICLES

FIELD OF THE INVENTION

The invention relates to a hydraulic drive mechanism for mobile vehicles.

BACKGROUND OF THE INVENTION

Hydraulic drive mechanisms for mobile vehicles are specially used for mobile machinery such as excavators, wheel loaders or also graders in which an internal combustion engine drives a hydraulic pump the flow rate of which supplies the hydraulic motors with pressure medium which, in turn, are connected with drive wheels which they drive. Axial piston motors of variable displacement are often used in order to change the rotational speed of the drive wheels. But in the axial piston motors, the maximum rotational speed is limited and to exceed the rotational speed would damage the motor.

U.S. Pat. No. 4,069,886 discloses a hydraulic drive mechanism for a mobile vehicle in which the front wheels can be driven via a respective motor and the rear wheels are directly driven by the internal combustion engine via a mechanical transmission. Since the rotational speed of the hydraulic motors is limited, the front wheels can be used only within a limited working range and above the working range have to be separated from the vehicle wheel via mechanical clutches. The motors are for this purpose entirely uncoupled mechanically. It is thereby possible, via the drive system proper of the vehicle, to operate the front wheels at a higher rotational speed than the admissible rotational speed of the hydromotors. The hydromotors are stationary here.

DE 39 07 633 C2 discloses a hydraulic drive mechanism for a mobile vehicle which serves as exclusive drive system; one internal combustion engine driving a hydraulic pump the flow rate of which supplies two hydromotors with pressure medium connectable with an output shaft via a reduction gear. Since the hydromotors are connected with the output shaft via different reduction gears, there is danger that one hydromotor is operated beyond its maximum rotational speed. For this reason, one clutch is disposed between the output shaft and one hydromotor in order that the hydromotor can be mechanically uncoupled.

The problem on which this invention is based is to provide a hydraulic drive mechanism for mobile vehicles in which at least one hydraulic motor drives one output shaft and also can remain connected with the output shaft even above a maximum rotational speed of the motor by the motor being operable above its maximum rotational speed.

SUMMARY OF THE INVENTION

According to the invention, the hydraulic drive mechanism has at least one motor, the displacement of which is adjustable and can be changed down to zero. In this state, the hydromotor has almost no displacement whereby, on one side, it absorbs no flow except the leakage of the pump flow and, on the other, it generates no rotational speed. In addition, the pressure-medium supply line and the pressure-medium return line from the pump to the motor are closed and the pressure-medium supply line and the pressure-medium return line of the hydraulic motor are short circuited and loaded with a low pressure. This is preferably the lubrication pressure of the transmission (return pressure toward radiator). It is also possible to use the feed pressure. Thereby only a very low pressure acts upon the motor on its high-pressure and low-pressure sides whereby all parts of the motor are pressurized with low stresses thereby producing a low resistance torque whereby the motor can be operated at a very high rotational speed. The motor is preferably designed as a radial piston motor having a crankshaft which is in operative connection with the pistons. By the motor being adjusted to a zero displacement so as to have almost no displacement, the eccentricity of the crankshaft is compensated whereby the crankshaft of the motor extends concentrically with its drive system and the pistons effect almost no lifting movement in the cylinders. The radial piston motor is preferably designed like the radial piston motor in WO99/17021 A1, the hydromotor being preferably adjusted not mechanically, but hydraulically whereby the adjusting pistons in the crank shaft are adjusted via hydraulic pressure. The hydraulic pressure is preferably connected with the pressure-medium supply line of the motorwhereby the motor is automatically adjusted to the zero displacement when the pressure-medium supply line is disconnected. The motor is preferably first adjusted to zero displacement and then separated from the high pressure.

In another embodiment, in the disengaged state of the hydraulic motor, the pressure-medium supply line and the pressure-medium return line are connected with the pressure-medium exit of a feed pump or the lubrication pressure of the transmission (return pressure toward radiator) whereby the leakage of the hydraulic motor is permanently replenished with cool pressure medium. An overheating of the motor is thus prevented. By virtue of the hydraulic separation from the high pressure and the adjustment to zero displacement of the hydraulic motor, it is no longer needed mechanically to separate the motor from the output whereby no engagement jerks result when uncoupling or recoupling. By the motor remaining loaded with feed pressure or lubrication pressure, the cylinders do not empty whereby no jerk results when shifting.

In one other embodiment, the hydraulic motor is configured as additional drive mechanism for front wheels such as a grader, the main drive results via the internal combustion engine and a reduction gear; the hydraulic motors are engaged during a defined working range and above the admissible rotational speed of the hydromotor which is hydraulically connected with the feed pressure or lubrication pressure and is adjusted to zero absorption volume whereby the hydraulic motor can be operated above its rotational speed.

In another embodiment, at least two hydraulic motors are connected with one output shaft via a summarizing transmission and form the drive mechanism of the vehicle. Both motors are permanently in mechanical operative connection with the output shaft and are adjustable in their absorption volume. Between the output shaft and the hydromotor can be located reduction gears of a different ratio. If the hydromotor is operated above its admissible rotational speed, it has no displacement and its supply and return lines are connected with the feed pressure or lubrication pressure. Also it is possible to operate the motors in open circuit.

By the motors not being disposed upon the output shaft, it is possible to place the pressure-medium supply line for adjustment of the displacement in the crankshaft on one side thereof and connect it with the high pressure. The sealing can thus be placed on a small diameter whereby high rotational speeds are possible even with high pressures.

The invention thus provides a hydraulic drive mechanism which can be operated also above its maximum admissible rotational speed and needs no mechanical disengagement devices.

BRIEF DESCRIPTION OF THE DRAWINGS

The invention will now be described, by way of example, with reference to the accompanying drawings in which.

DETAILED DESCRIPTION OF THE INVENTION

Figure 1:
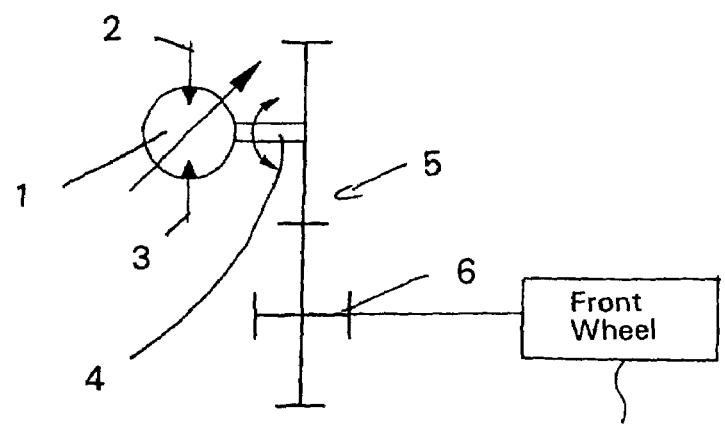
FIG. 1 is a diagram of a hydraulic motor with a reduction step.
Figure 3:
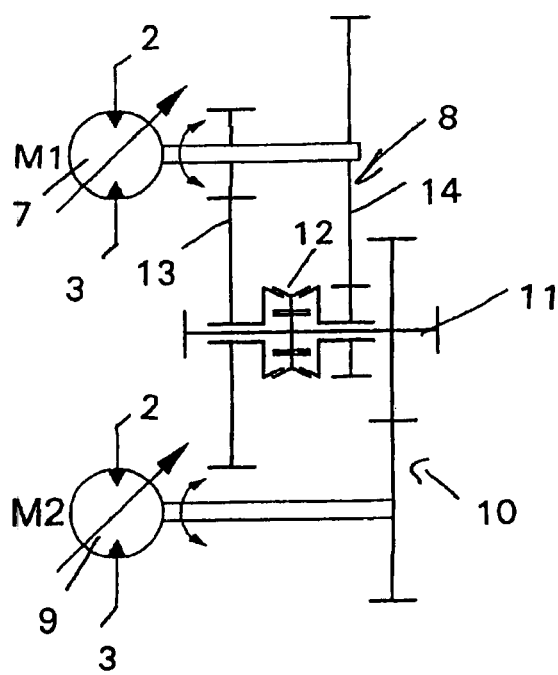
FIG. 3 is a diagram of a summarizing transmission with two hydraulic motors having one shiftable gear step.

FIG. 1:

One hydraulic motor 1 of adjustable displacement has one pressure-medium supply line 2 and one pressure-medium return line 3. The pressure-medium supply line 2 and the pressure-medium return line 3 are connected with a pressure-medium source (not shown). An output 4 of the motor 1 is connected with a reduction gear 5. An output 6 of the reduction gear 5 is connected with one vehicle wheel. If the output 4 is operated above a defined rotational speed, the pressure-medium supply line 2 and the pressure-medium return line 3 of the motor 1 are connected with the feed pressure or lubrication pressure of the pressure-medium source and the motor 1 is adjusted so as to have almost no displacement. The displacement and the shift valve can be controlled via an electronic control unit. The defined rotational speed is the maximum admissible rotational speed of the hydromotor when loaded with high pressure.

FIG. 2:

One first motor 7 drives one first reduction gear 8 and one second motor 9 drives one second reduction gear 10. The pressure-medium supply lines 2 and the pressure-medium return lines 3 are connected in parallel with the pressure-medium source. The first reduction gear and the second reduction gear can have the same ratio, but it is advantageous to design the reduction gears with different ratios. The ratios are preferably designed so that in a first working range the first motor 7 and the second motor 9 are connected in parallel with the delivery exit of the pressure medium source and the suction inlet of the pressure-medium source, the delivery exit being connected with the pressure-medium supply line and the suction inlet with the pressure-medium return line. By adjusting the volume of the hydraulic pump of the first motor 7 and of the second motor 9, it is possible to change the rotational speed of the output shaft 11, which is connected both with the first reduction gear 8 and with the second reduction gear 10. The hydromotor and the ratio are preferably designed so that the motor, which in the second drive range has no more displacement and is operated above its maximum rotational speed, reaches its maximum rotational speed at the end of the first drive range. This motor is then adjusted to almost no displacement and the pressure-medium supply line 2 and the pressure-medium return line 3 are hydraulically connected with the feed pressure or lubrication pressure of the pressure-medium source. It is also possible to connect the pressure-medium supply line 2 and the pressure-medium return line 3 with a line which has the same pressure as the suction inlet of the pressure-medium source. In the second drive range the displacement of the still remaining motor is then further reduced and the other motor operated above its admissible rotational speed without mechanically separating the two motors from the output shaft 11.

Figure 2:
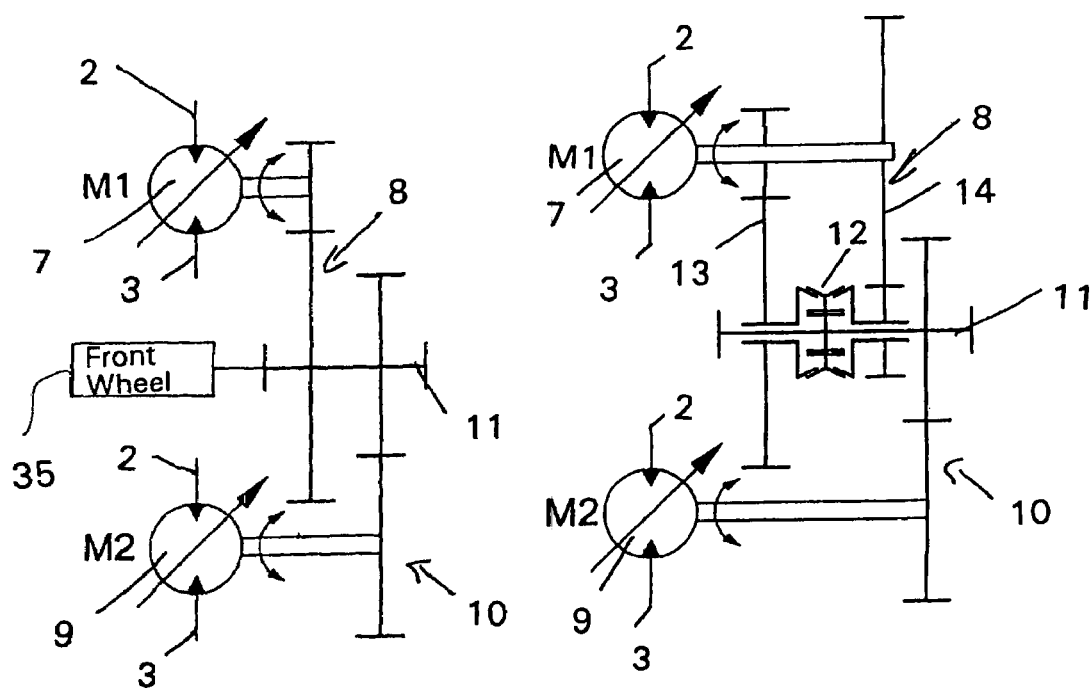
FIG. 2 is a diagram of a summarizing transmission with two hydraulic motors.
Figure 2A:
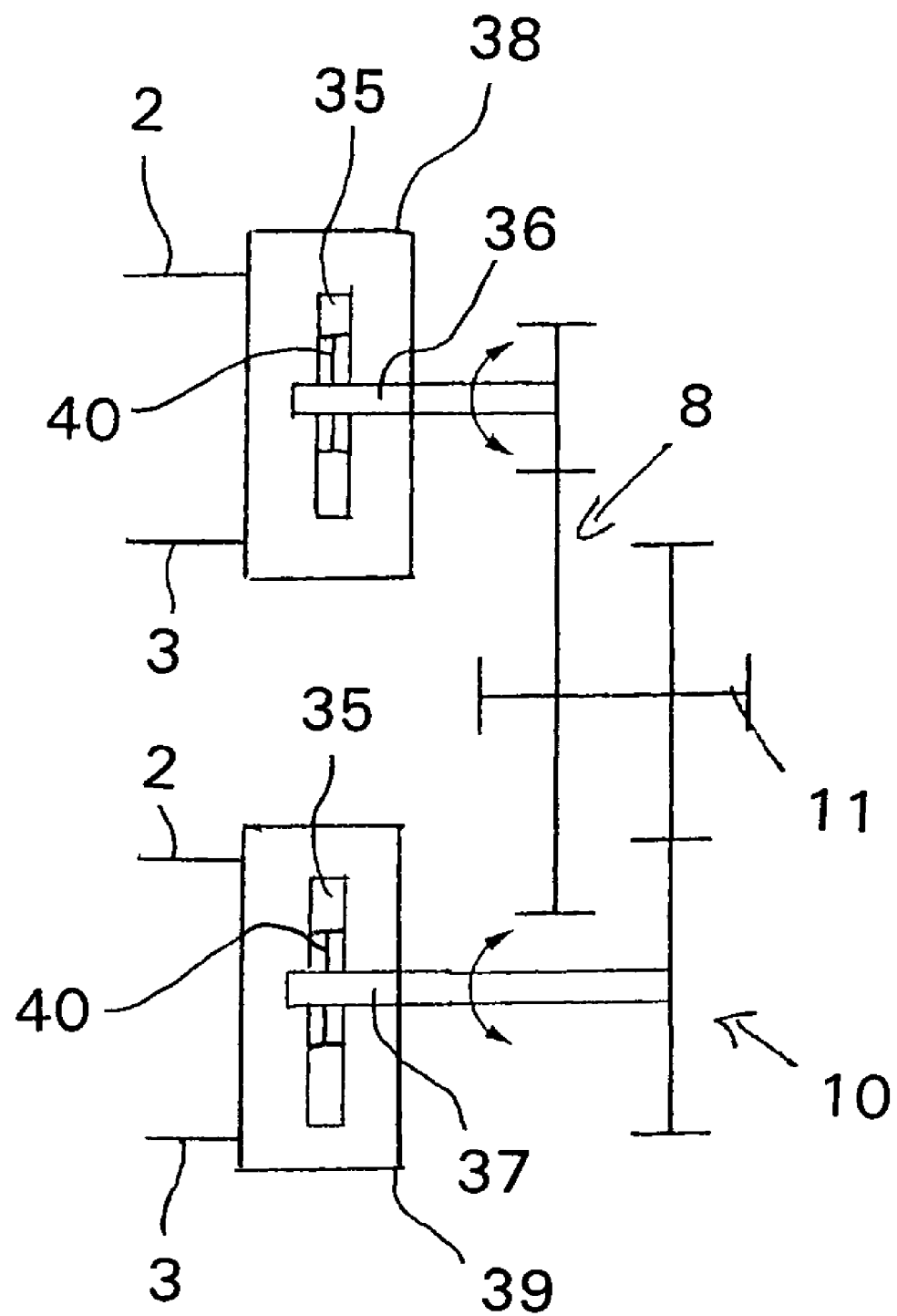
FIG. 2A is a diagram of a summarizing transmission showing the hydraulic motors as radial piston motors.
Figure 4:
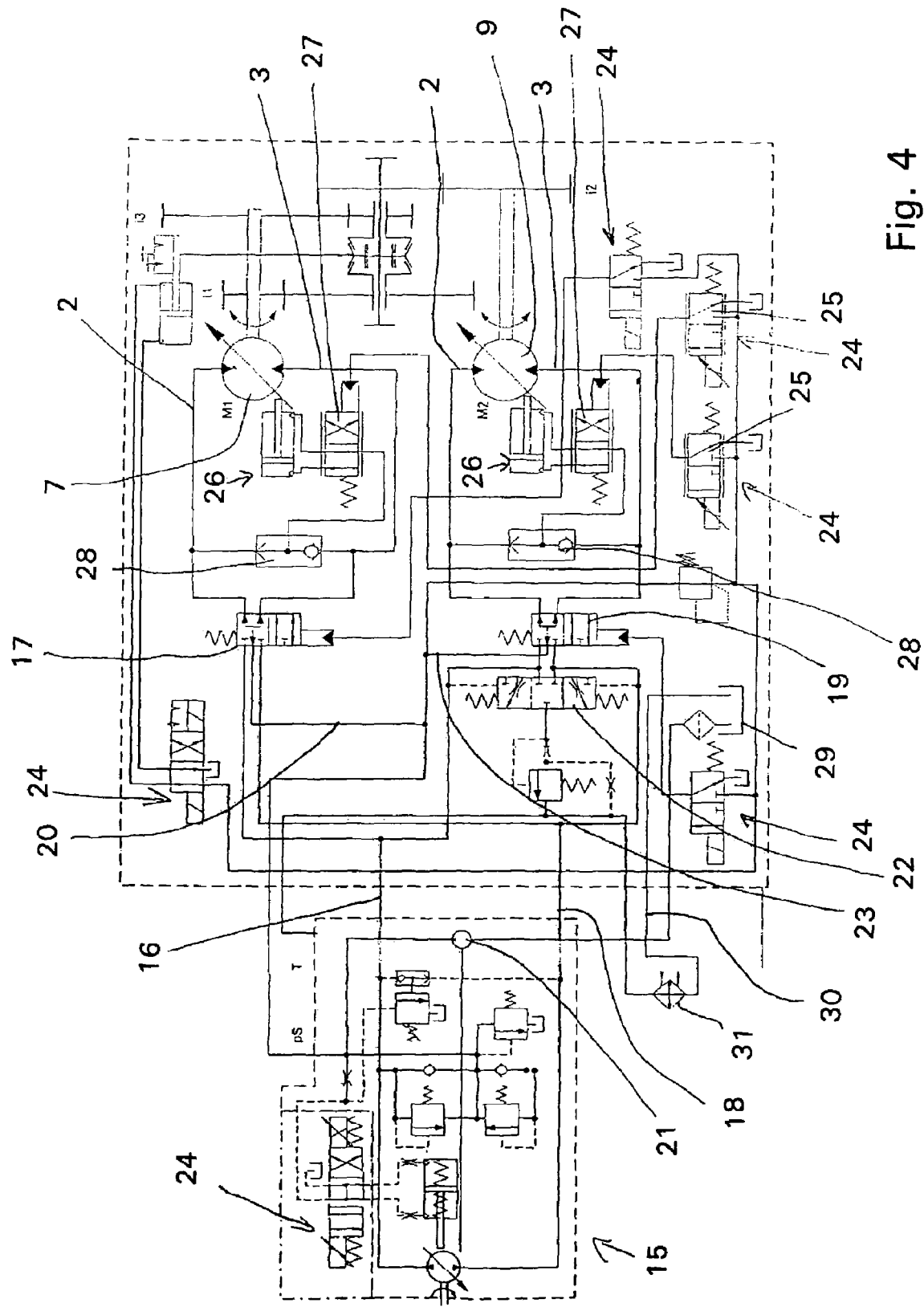
FIG. 4 is a hydraulic circuit diagram of the inventive drive mechanism.

FIG. 3:

The first motor 7, having a crankshaft 36 and the second motor 9, having a crankshaft 36 are connected with an output shaft 11, respectively, via the first reduction gear 8 and a second reduction gear 10. As diagrammatically shown in FIG. 2A, both the first and the second motors (7, 9) are radial piston motors (38, 39). The first reduction gear 8 is shiftably effected via a shift device 12, the output shaft 11 being connectable via the shift device 12 with the first motor 7 via a first reduction 13 or via a second reduction 14. The shift device 12 is preferably designed as a synchronizer device and an engagement of the shift device is effected when the motor 7 has almost no displacement and is hydraulically separated from the circuit. The shift device 12 is barely loaded in this state inasmuch as only the inert masses of the gear wheels and shafts have to be accelerated, since the pistons (40) effect no stroke motion in the cylinders (35) and do not rotate. During the gear shift, the pressure-medium supply line 2 and the pressure-medium return line 3 are connected with the feed pressure or lubrication pressure whereby the bearing forces of the hydromotor become further reduced. In order to achieve the greatest torque possible during the starting operation, the starting is effected with both motors and full displacement, the greater reduction 13 being engaged via the shift device 12. By changing the displacement of the pressure-medium source and of the first motor 7 and of the second motor 9, the rotational speed of the output shaft 11 is increased. When reaching a maximum rotational speed of the first motor 7 or of the second motor 9, a shift is made via the shift device 12 to the lower ratio 14 whereby, during the maximum output rotational speed of the output shaft 11, the first motor 7 drives the output shaft 11 via the second reduction ratio 14 and the second motor 9 has no displacement and is hydraulically connected with the low pressure or lubrication pressure.

FIG. 4:

One pressure-medium source 15 is driven by a prime mover (not shown). A delivery exit 16 is connected with the pressure-medium supply line 2 of the first motor 7 via a valve 17. A suction inlet 18 is connected with the pressure-medium return line 3 of the first motor 7 also via the valve 17. The delivery exit 16 and the suction inlet 18 are connected with the pressure-medium supply line 2 and the pressure-medium return line 3 of the second motor 9 via a valve 19. Depending on the flow rate of the pressure-medium source 15, the delivery exit 16 and the suction inlet 18 can interchange. The valve 17 and the valve 19 are connected with the low pressure via a line 20 or 23. The lines 20 and 23 are preferably connected with the exit of a feed pump 21 whereby cooled pressure medium reaches the line 20. But it is also possible to connect the line 20 with the exit line of a flush valve 22 whereby the line 20 can, likewise, be loaded with low pressure. The valve 19 is also connected with the low pressure, likewise, via its line 23. In addition, it is possible to connect the lines 20 and 23 with a return line 30 from a radiator 31 to a tank 29. An electronic control unit (not shown) is connected with valves 24, valves 25 being designed as proportional valves. The proportional valves 25 load a displacement adjusting device 26 thus adjusting the displacement of the hydromotor 7 and 9. By valves 27 supplied with pressure by a valve 28 connected with the pressure-medium supply line 2 and the pressure-medium return line 3 being situated between the displacement adjusting device 26 and the proportional valves 25, it is possible by shifting the valves 25 automatically to adjust the displacement of the first motor 7 or the second motor 9 so that it has almost no displacement. The motor 7 or 9 is preferably at first adjusted via the valve 27 to zero displacement and then the valve 17 or 19 is shifted so that the pressure-medium supply line 2 and the pressure-medium return line 3 is connected with the line 20 and thereby the adjusting device 26 is also connected with the line 20 whereby the displacement of the motor cannot be enlarged. But if valve 17 or valve 19 is shifted so that the pressure-medium supply line 2 and the pressure-medium return line 3 is respectively connected with the delivery exit 16 of the pressure-medium source 15 and the suction inlet 18, then a valve 28 takes care that the adjusting device 26 is loaded with the high pressure whereby an adjustment of the motor 7 or 9 is possible.

In one other embodiment of the invention, the first motor 7, the second motor 9, the same as the reduction gear 5 and the valves, are located within the transmission housing which, at the same time, constitutes the tank 29. The leakage of the hydromotors thus directly reaches the transmission housing and mixes with the pressure medium in the tank. The hydromotors are preferably situated above the pressure medium level of the tank whereby loss by churning is prevented.

REFERENCE NUMERALS 1 motor
2 pressure-medium supply line
3 pressure-medium return line
4 output
5 reduction gear
6 output
7 first motor
8 first reduction gear
9 second motor
10 second reduction gear
11 output shaft
12 shift device
13 first reduction
14 second reduction
15 pressure-medium source
16 delivery exit
17 valve
18 suction inlet
19 valve
20 line
21 feed pump
22 flush valve
23 line
24 electronic control unit
26 proportional valves
26 displacement adjusting device
27 valve
28 valve
29 tank
30 return line
31 radiator

The invention claimed is:

1. A hydraulic drive mechanism for a mobile vehicle having at least first and second hydrostatic motors (7, 9), each of the first and the second hydrostatic motors (7, 9) being connected with a delivery exit (16) of a pressure-medium source (15) via a pressure-medium supply line (2) and a suction inlet (18) of the pressure-medium source (15) via a pressure-medium return line (3), the first and the second hydrostatic motors (7, 9) both drive a common output shaft (11), and a plurality of pistons of the first and the second hydrostatic motors (7, 9) are variably displaced via a displacement adjusting device (26) such that the rotational speed of the output shaft is variable;

wherein each of the first and the second hydrostatic motors (7, 9) is a radial piston motor which has a crankshaft that is operatively connected with the plurality of pistons located in cylinders of the radial piston motor, a stroke of each of the plurality of pistons being adjustable, during rotation of the crankshaft, by the adjusting device (26) such that when the crankshaft of the first hydrostatic motor (7) is driven above a maximum admissible driving rotational speed the pistons of the first hydrostatic motor (7) effect substantially no stroke in the cylinders and the pressure-medium supply line (2) is separated from the delivery exit (16) and connected with the pressure-medium return line (3) so that pressure which acts upon the pressure-medium return line (3) and upon the pressure-medium supply line (2) is the pressure which acts upon one of a suction inlet (18) of the pressure-medium source (15) or in a return line (30) from a radiator (31) to a tank (29) or in a feed pressure line so that the crankshaft of the first hydrostatic motor (7) can be driven at rotational speed higher than the maximum admissible driving rotational speed, and the crankshaft of the first hydrostatic motor (7) and the crankshaft of the second hydrostatic motor (9) are both permanently connected to the common output shaft (11) so as to continuously rotate with the common output shaft (11).

2. The hydraulic drive mechanism for a mobile vehicle according to claim 1, wherein the drive mechanism drives at least one front wheel of a construction machine.

3. The hydraulic drive mechanism for a mobile vehicle according to claim 1, wherein the output shaft of the first hydrostatic motor (7) is one of directly or indirectly coupled with one output shaft of the second hydrostatic motor (9), and driving torques of the first and second hydrostatic motors are added up and fed to the common output shaft (11).

4. The hydraulic drive mechanism for a mobile vehicle according to claim 3, wherein between the first hydrostatic motor (7) and a common output shaft (11) and between the second hydrostatic motor (9) and the common output shaft (11) is respectively disposed a first reduction gear (8) and a second reduction gear (10).

5. The hydraulic drive mechanism for a mobile vehicle according to claim 4, wherein a ratio of the first reduction gear (8) is higher than a ratio of the second reduction gear (10).

6. The hydraulic drive mechanism for a mobile vehicle according to claim 1, wherein the first hydrostatic motor (7) acts as drive mechanism of the mobile vehicle and when the first hydrostatic motor (1) is loaded with high pressure and a speed corresponding to the maximum admissible rotational speed is exceeded, the pressure-medium supply line (2) is automatically separated from the delivery exit (16) and connected with the pressure-medium return line (3).

7. The hydraulic drive mechanism for a mobile vehicle according to claim 1, wherein the pressure acting upon the suction inlet (18) is produced by a feed pump (21).

8. The hydraulic drive mechanism for a mobile vehicle according to claim 1, wherein the pressure-medium supply line (2) and the pressure-medium return line (3) are connected with an exit of a flush valve (22).

9. The hydraulic drive mechanism for a mobile vehicle according to claim 1, wherein the pressure-medium supply line (2) and the pressure-medium return line (3) are connected with a line (20, 23) which is connected with pressure medium exit of a feed pump (21).

10. The hydraulic drive mechanism for a mobile vehicle according to claim 1, wherein the pressure-medium supply line (2) and the pressure-medium return line (3) are connected with the return line (30) from the radiator (31) to the tank (29).

11. A hydraulic drive mechanism for a mobile vehicle having at least first and second variable displacement hydrostatic motors (7, 9), each of the first and the second hydrostatic motors (7, 9) being connected with a delivery exit (16) of a pressure-medium source (15) via a pressure-medium supply line (2) and a suction inlet (18) of the pressure-medium source (15) via a pressure-medium return line (3), the first and the second hydrostatic motors (7, 9) both drive a common output shaft, the first hydrostatic motor (7) drives the common output shaft via a first gear, at a first gear ratio, and the second hydrostatic motor (9) drives the common output shaft via a second gear, at a second gear ratio, a first displacement adjusting device (26) variably adjusts a volume of pressure medium flow to the first hydrostatic motor (7) to variably adjust a driving rotational output speed of the first hydrostatic motor (7) up to a maximum admissible driving rotational speed, a second displacement adjusting device (26) variably adjusts a volume of pressure medium flow to the second hydrostatic motor (9) to variably adjust a driving rotational output speed of the second hydrostatic motor (9), and when the first hydrostatic motor (7) reaches the maximum admissible driving rotational speed, only the second hydrostatic motor (9) supplies drive to the common output shaft while a crankshaft of the first hydrostatic motor (7) remains permanently connected with the common output shaft (11) so as to continuously rotate with the common output shaft (11).

* * * * *